(12) United States Patent
Cheng et al.

(10) Patent No.: US 9,740,253 B2
(45) Date of Patent: Aug. 22, 2017

(54) ELECTRONIC APPARATUS

(71) Applicants: Inventec (Pudong) Technology Corporation, Shanghai (CN); INVENTEC CORPORATION, Taipei (TW)

(72) Inventors: Yi-Lun Cheng, Taipei (TW); Feng-Ku Wang, Taipei (TW); Chih-Kai Yang, Taipei (TW); Wei-Yi Lin, Taipei (TW); Po-Hsuan Chen, Taipei (TW)

(73) Assignees: Inventec (Pudong) Technology Corporation, Shanghai (CN); INVENTEC CORPORATION, Taipei (TW)

( * ) Notice: Subject to any disclaimer, the term of this patent is extended or adjusted under 35 U.S.C. 154(b) by 0 days.

(21) Appl. No.: 15/157,426

(22) Filed: May 18, 2016

(65) Prior Publication Data
US 2017/0153677 A1    Jun. 1, 2017

(30) Foreign Application Priority Data
Nov. 27, 2015  (CN) .......................... 2015 1 0846749

(51) Int. Cl.
*G06F 1/16*   (2006.01)
*G06F 1/20*   (2006.01)

(52) U.S. Cl.
CPC ............ *G06F 1/203* (2013.01); *G06F 1/1616* (2013.01); *G06F 1/1637* (2013.01); *G06F 1/1667* (2013.01); *G06F 1/1681* (2013.01)

(58) Field of Classification Search
CPC ...... G06F 1/203; G06F 1/1616; G06F 1/1637; G06F 1/1667; G06F 1/1681
See application file for complete search history.

(56) References Cited

U.S. PATENT DOCUMENTS

| | | | | |
|---|---|---|---|---|
| 4,742,478 A | * | 5/1988 | Nigro, Jr. .............. | G06F 1/1616 312/223.2 |
| 4,951,241 A | * | 8/1990 | Hosoi ........................ | B41J 3/36 361/679.09 |
| 5,111,361 A | * | 5/1992 | Kobayashi ............ | G06F 1/1616 108/132 |
| 5,534,891 A | * | 7/1996 | Takano ................. | G06F 1/1616 345/169 |
| 5,552,960 A | * | 9/1996 | Nelson .................... | G06F 1/203 165/104.33 |

(Continued)

*Primary Examiner* — Adrian S Wilson
(74) *Attorney, Agent, or Firm* — CKC & Partners Co., Ltd.

(57) ABSTRACT

Electronic apparatus includes a display component, a base, a moveable case, and a transmission component. The display component includes a rotational shaft. The base is pivotally connected to the rotational shaft. The base has an opening. The moveable case is pivotally connected to the base. The moveable case can selectively cover or uncover the opening. The transmission component is disposed on the base. The transmission component is operatively connected between the rotational shaft and the moveable case. When the display component is rotated away from the base, the rotational shaft actuates the moveable case to rotate to uncover the opening through the transmission component. When the display component is rotated toward the base, the rotational shaft actuates the moveable case to rotate to cover the opening through the transmission component.

7 Claims, 4 Drawing Sheets

(56) References Cited

U.S. PATENT DOCUMENTS

| | | | | |
|---|---|---|---|---|
| 5,754,395 A * | 5/1998 | Hsu | G06F 1/1667 | 361/679.11 |
| 5,764,474 A * | 6/1998 | Youens | G06F 1/1616 | 345/169 |
| 5,818,360 A * | 10/1998 | Chu | G06F 1/1667 | 248/118.3 |
| 5,818,690 A * | 10/1998 | Spencer | G06F 1/1616 | 248/918 |
| 5,918,957 A * | 7/1999 | Bovio | G06F 1/1656 | 312/223.2 |
| 5,946,187 A * | 8/1999 | Cipolla | G06F 1/203 | 16/371 |
| 6,028,768 A * | 2/2000 | Cipolla | G06F 1/1616 | 361/679.12 |
| 6,091,600 A * | 7/2000 | Jeong | G06F 1/1616 | 361/679.12 |
| 6,175,492 B1 * | 1/2001 | Nobuchi | G06F 1/1616 | 361/679.08 |
| 6,414,842 B1 * | 7/2002 | Cipolla | G06F 1/1616 | 361/679.46 |
| 6,459,573 B1 * | 10/2002 | DiStefano | G06F 1/203 | 361/679.46 |
| 6,496,369 B2 * | 12/2002 | Nakamura | G06F 1/1616 | 165/80.3 |
| 6,612,668 B2 * | 9/2003 | Doan | G06F 1/1616 | 16/303 |
| 6,762,931 B2 * | 7/2004 | Chen | G06F 1/1616 | 292/163 |
| 6,853,543 B1 * | 2/2005 | Moore | G06F 1/1667 | 361/679.12 |
| 6,930,881 B2 * | 8/2005 | Karidis | G06F 1/1616 | 16/286 |
| 7,206,198 B2 * | 4/2007 | Wang | G06F 1/166 | 312/223.1 |
| 7,312,988 B2 * | 12/2007 | Maeda | F21V 29/20 | 361/679.48 |
| 7,558,062 B2 * | 7/2009 | Wang | G06F 1/203 | 165/185 |
| 7,746,636 B2 * | 6/2010 | Tang | G06F 1/1616 | 361/679.55 |
| 7,855,883 B2 * | 12/2010 | Tang | G06F 1/1616 | 361/679.55 |
| 7,894,184 B2 * | 2/2011 | Huang | G06F 1/1616 | 361/679.11 |
| 8,520,382 B2 * | 8/2013 | Tye | G06F 1/203 | 248/685 |
| 8,926,414 B1 * | 1/2015 | Kirkpatrick | H05K 7/20136 | 361/679.41 |
| 8,937,806 B2 * | 1/2015 | Senatori | G06F 1/203 | 165/104.33 |
| 8,976,524 B2 * | 3/2015 | Wang | H05K 5/0213 | 165/104.33 |
| 9,354,669 B2 * | 5/2016 | Chen | G06F 1/1681 | |
| 9,582,048 B2 * | 2/2017 | Ho | G06F 1/1616 | |
| 2003/0038567 A1 * | 2/2003 | Doan | G06F 1/1616 | 312/223.2 |
| 2004/0012919 A1 * | 1/2004 | Chen | G06F 1/1616 | 361/679.11 |
| 2007/0053143 A1 * | 3/2007 | Kang | G06F 1/203 | 361/678 |
| 2009/0201639 A1 * | 8/2009 | Wang | G06F 1/203 | 361/679.54 |
| 2009/0273893 A1 * | 11/2009 | Wilson | G06F 1/1616 | 361/679.12 |
| 2010/0002379 A1 * | 1/2010 | Hadad | G06F 1/166 | 361/679.59 |
| 2010/0165567 A1 * | 7/2010 | Shih | G06F 1/1616 | 361/679.48 |
| 2011/0292605 A1 * | 12/2011 | Chen | G06F 1/1616 | 361/695 |
| 2012/0127652 A1 * | 5/2012 | Lin | G06F 1/203 | 361/679.46 |
| 2013/0327507 A1 * | 12/2013 | Degner | G06F 1/203 | 165/120 |
| 2014/0160659 A1 * | 6/2014 | Massaro | G06F 1/203 | 361/679.27 |
| 2017/0060201 A1 * | 3/2017 | Prather | G06F 1/203 | |

* cited by examiner

ELECTRONIC APPARATUS

RELATED APPLICATIONS

This application claims priority to Chinese Application Serial Number 201510846749.2, filed Nov. 27, 2015, which is herein incorporated by reference.

BACKGROUND

Field of Invention

The present disclosure relates to a electronic apparatus. More particularly, the present disclosure relates to a self-dedusting fan electronic apparatus.

Description of Related Art

Nowadays, portable electronic apparatus developed with advance technologies becomes thinner and lighter. Therefore, electronic components installed inside the portable electronic apparatus, such as central processing unit (CPU), hardware disk drive (HDD) . . . etc., also require to be developed much thinner and lighter under thinning tendency, and the electronic components still enable to function more powerful. Correspondingly, while the electronic components with more powerful function is operated, more heat may be generated and accumulated inside the housing of the portable electronic apparatus. However, the portable electronic apparatus needs to assemble the electronic components more compactly into a limited space within a housing of the portable electronic apparatus, to pursue the thinning tendency. That is, a limited space within the housing of the thinning portable electronic apparatus needs to accommodate with more heat-generated components. Furthermore, the crowding heat-generated components may also occupy a reserved space inside the housing for installing heat dissipation component, and cover a part of a heat-dissipation-component-requested heat-dissipated channel. Accordingly, the portable electronic apparatus may request an additional space for heat dissipated or heat dissipation component for the portable electronic apparatus to exchange heat with circumstance, so that the heat dissipation component can dissipate heat accumulated within the housing of the portable electronic apparatus.

Consequently, the available structure of a portable electronic apparatus, as described above, apparently exists with inconvenience and defect, which needs further improvement. To deal with aforesaid problem, practitioners of ordinary skill in the art have striven to attain a solution, still lacks a suitable solution to be developed. Therefore, to deal with aforesaid problem effectively is an important subject of research and development, and also a desired improvement in the art.

SUMMARY

The present disclosure provides an electronic apparatus. The electronic apparatus includes a display component, a base, a moveable case, and a transmission component. The display component includes a rotational shaft. The base is pivotally connected to the rotational shaft. The base has an opening. The moveable case is pivotally connected to the base. The moveable case can selectively cover or uncover the opening. The transmission component is disposed on the base, and operatively connected between the rotational shaft and the moveable case. When the display component is rotated away from the base, the rotational shaft actuates the moveable case to rotate to uncover the opening through the transmission component. When the display component is rotated toward the base, the rotational shaft actuates the moveable case to rotate to cover the opening through the transmission component.

It is to be understood that both the foregoing general description and the following detailed description are by examples, and are intended to provide further explanation of the invention as claimed.

BRIEF DESCRIPTION OF THE DRAWINGS

The disclosure can be more fully understood by reading the following detailed description of the embodiment, with reference made to the accompanying drawings as follows.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION

Figure 1:
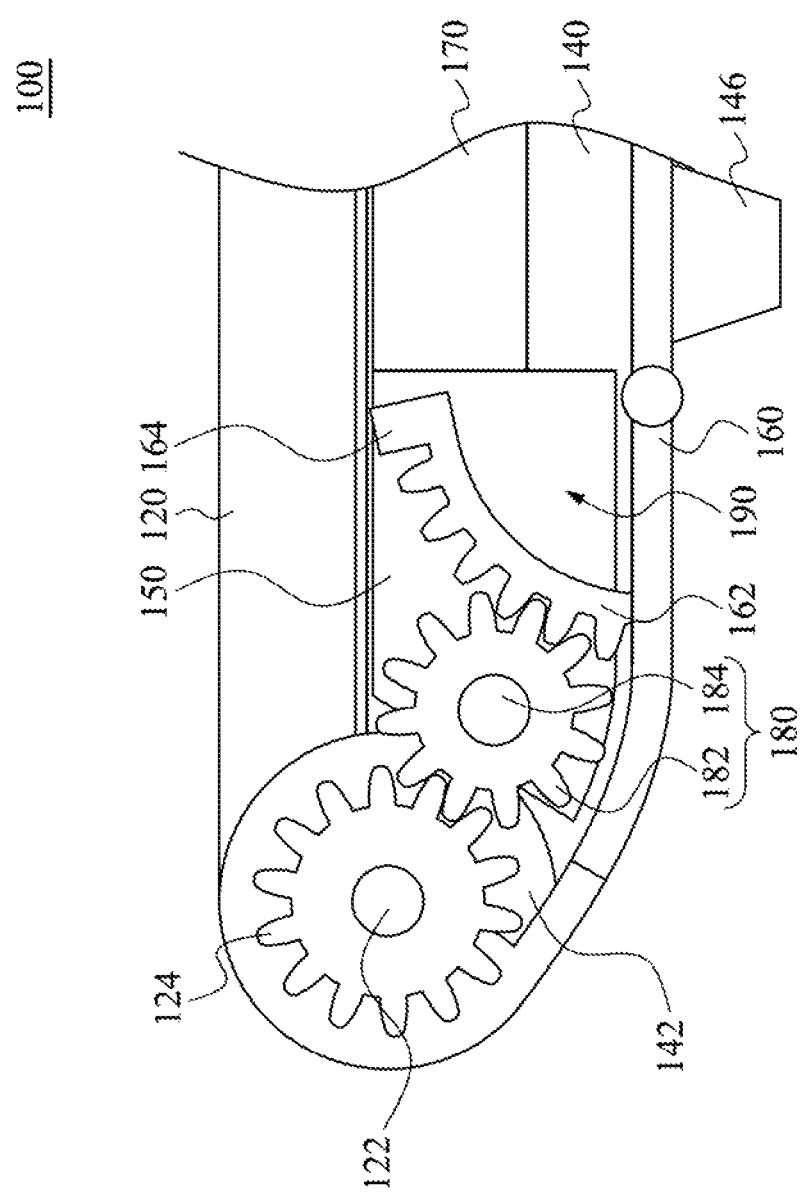
FIG. 1 and FIG. 2 are longitudinal sectional views of an electronic apparatus at different states according to an embodiment of the present disclosure.

Reference will now be made in detail to the present embodiments of the invention, examples of which are illustrated in the accompanying drawings. Wherever possible, the same reference numbers are used in the drawings and the description to refer to the same or like parts.

Furthermore, relative terms, such as "lower" or "bottom" and "upper" or "top", may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower", can therefore, encompasses both an orientation of "lower" and "upper", depending of the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

Figure 2:
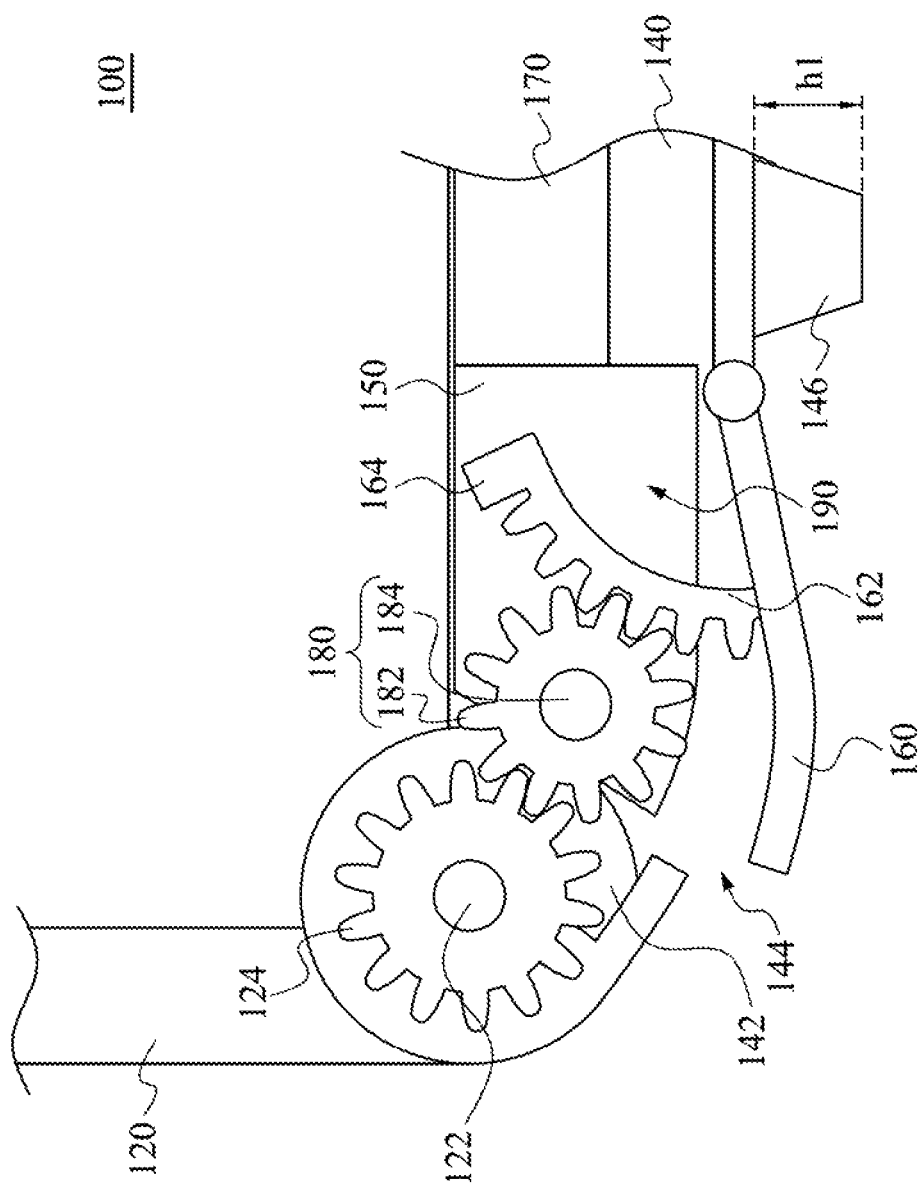

FIG. 1 illustrates a longitudinal sectional view of an electronic apparatus 100, when a display component 120 covers a base 140, according to an embodiment of the present disclosure. FIG. 2 illustrates a longitudinal sectional view of an electronic apparatus 100, when a display component 120 rotates relative to a base 140 and open from the base 140, according to an embodiment of the present disclosure. As illustrated in FIG. 1, the electronic apparatus 100 includes the display component 120, the base 140, a moveable case 160, and a transmission component 180. The display component 120 includes a rotational shaft 122. The rotational shaft 122 pivotally connects a pivotally-connected portion 142 of the base 140. The base 140 has an opening 144 (as shown in FIG. 2). The moveable case 160 is pivotally connected to the base 140, and configured to selectively cover or uncover the opening 144. The transmission component 180 is disposed on the base 140, and operatively connects the rotational shaft 122 and the moveable case 160. In some embodiments, the transmission component 180 can be a gear, a gear set, a connecting rod, or other suitable operatively connecting structure. When the display component 120 is rotated away from the base 140, the rotational shaft 122 rotating with the display component 120 can actuate the moveable case 160 to rotate to uncover the opening 144 through the transmission component 180 (as shown in FIG. 2). When the display component 120 is rotated toward the base 140, the rotational shaft 122 rotating with the display component 120 can actuate the moveable case 160 to rotate to cover the opening 144 through the transmission component 180.

It should be noted that, a connecting relation between the transmission component 180, the rotational shaft 122 and the moveable case 160, shown in FIGS. 1 and 2, is only an exemplary, and not intended to limit the present disclosure. The connecting relation between the transmission component 180, the rotational shaft 122 and the moveable case 160 can be other structures. For example, the transmission component 180 can be a gear, a gear set, a connecting rod, or other suitable structure. Moreover, another structure can be disposed between the transmission component 180 and the moveable case 160, which is configured to connect the transmission component 180 and the moveable case 160, such that when the display component 120 is rotated relative to the base 140, the display component 120 can actuate the moveable case 160 to selectively uncover or cover the opening 144 through the transmission component 180. It should be understood that, aspect of the connecting relation, described above, could be adjusted to actual demand by those skilled in the art, without departed from the scope or the spirits of the present disclosure. That is to say, prerequisite of the electronic apparatus 100 is that, when the display component 120 is rotated, the display component 120 can actuate the moveable case 160 through the transmission component 180, such that the moveable case 160 can be rotated relative to the base 140, and selectively rotated toward the base 140 to cover the opening 144 or rotated away from the base 140 to uncover the opening 144.

As illustrated in FIG. 1, due to the moveable case 160 can cover the opening 144 while the display component 120 covers the base 140, the moveable case 160 can reduce or avoid a dust or a foreign matter from circumstance penetrating into the base 140 of the electronic apparatus 100. Referring to FIG. 2, when the display component 120 is rotated relative to the base 140 and leaving away from the base 140, the display component 120 actuates the moveable case 160 to rotate along a direction leaving away from the base 140 through the transmission component 180, to uncover the opening 144 covered by the moveable case 160 and communicate the opening 144 with the heat-dissipated channel 190, which would be described later. The cold air from circumstance can be exchanged through the heat-dissipated channel 190 into heat-dissipated modules of the base 140, for example, heat-dissipated modules including heat-dissipated fins 150 or a fan module 170. Moreover, the heat-dissipated modules of the base 140 can exhale the heated air, generated by the heat-dissipated modules, out to circumstance through the opening 144 connecting to the heat-dissipated channel 190, to transport the heat accumulated inside the base 140 outside. Therefore, the electronic apparatus 100 having a greater heat dissipation efficiency may release or diffuse heat, which is generated by electronic components of the electronic apparatus 100, accumulated inside the electronic apparatus 100 properly, so that the electronic apparatus 100 may avoid or reduce the electronic components inside the electronic apparatus 100, such as central processing unit (CPU), hardware disk drive (HDD) or graphical processing unit (GPU) . . . etc., being ruined or malfunctioned under the heat. That is, the electronic apparatus 100 can be thinning, and still operated with improved heat-dissipated efficiency.

Besides, in some embodiments, the transmission component 180 can be disposed inside the base 140, plug-in outside the base 140, or extended from outside the base 140 into the base 140, and not intended to limit the present disclosure. It should be understood that, aspect of the transmission component 180, described above, is only an exemplary, could be adjusted to actual demand by those skilled in the art, without departed from the scope or the spirits of the present disclosure. That is to say, prerequisite of the transmission component 180 is that, when the display component 120 is rotated, the display component 120 can actuate the moveable case 160 through the transmission component 180, such that the moveable case 160 can be rotated relative to the base 140, and selectively rotated toward the base 140 to cover the opening 144 or rotated away from the base 140 to uncover the opening 144. Therefore, a limited space inside the base 140 can be elastically arranged to accommodate the transmission component 180 for arranging other components disposed within the base 140.

Referring back to FIG. 1, in some embodiments, the transmission component 180 may include at least one transmission gear 182. The transmission gear 182 is pivotally connected to the base 140. In some embodiments, the transmission gear 182 is disposed on the base 140 through pivotally connected to the rotational pivot 184. The rotational shaft 122 may includes a first rack 124. In some embodiments, the first rack 124 can be surrounded, partially surrounded the rotational shaft 122, or other suitable arrangement, and configure to mesh with the transmission gear 182. The moveable case 160 may include a second rack 162. In some embodiments, the second rack 162 can be disposed on a side of the moveable case proximal to the transmission gear 182. In some embodiments, the second rack 162 can be disposed inside the base 140, plug-in outside the base 140, or extended from outside the base 140 into the base 140, and not intended to limit the present disclosure. The transmission gear 182 meshes with the first rack 124 and the second rack 162 respectively. When the display component 120 is rotated relative to the base 140, the first rack 124 rotates relative to the transmission gear 182, to make the transmission gear 182 actuate the moveable case 160 to rotate relative to the base 140 through the second rack, as shown in FIGS. 1 and 2.

Referring to FIG. 2, the base 140 may further include supporting structures 146. The supporting structures 146 are disposed on a bottom surface of the base 140, and the supporting structures 146 have a supporting structural height h1 along a direction leaving away from the base 140. When the moveable case 160 is rotated to uncover the opening 144 till a fully-opened state, a height of the moveable case 160 relative to the surface of the base 140 is smaller than the supporting structural height h1. That is, when the moveable case 160 is rotating, an end of the moveable case 160 away from the base 140 rotating relative to the base 140 would not protrude outside the supporting structures 146 and exceed the supporting structural height h1 relative to the base 140, so that the moveable case 160 may reduce or avoid bumping with other object. Similarly, the other arrangement of the moveable case 160 and the transmission component 180, such as FIG. 4, can be designed as the electronic apparatus 100.

In some embodiments, the second rack 162 may include a stopping structure 164, disposed on an end of the second rack 162 away from the moveable case 160. The stopping structure is configured to engage the transmission gear 182 when the moveable case 160 is rotated to uncover the opening 144 to a predetermined state, in which the predetermined state is the fully-opened state.

In some embodiments, the transmission component 180 may include rotation pivots 184 and the transmission gears 182. The rotation pivots 184 are disposed on the base 140. In some embodiments, the transmission gears 182 can be pivotally connected to the rotation pivots respectively, and the transmission gears 182 are sequentially meshed. In some embodiment, part of the transmission gears 182 can disposed on the same transmission gear 182. At least one of the transmission gears 182 is meshed with the first rack 124, and at least one of the transmission gears 182 is meshed with the second rack 162. When the display component 120 rotates the rotational shaft 122 relative to the base 140, the first rack 124 rotates relative to the transmission gears 182, to make the transmission gears 182 actuate the moveable case 160 to rotate relative to the base 140 through the second rack 162.

It should be understood that, aspect of the transmission component 180, described above, is only an exemplary, could be adjusted to actual demand by those skilled in the art, without departed from the scope or the spirits of the present disclosure. For example, the transmission gears 182 can be disposed on the same rotation pivot 184, or each of the transmission gears 182 can be corresponded to different rotation pivots 184. That is to say, prerequisite of the transmission component 180 is that, when the display component 120 is rotated, the display component 120 can actuate the moveable case 160 through the transmission component 180, such that the moveable case 160 can be rotated relative to the base 140, and selectively rotated toward the base 140 to cover the opening 144 or rotated away from the base 140 to uncover the opening 144. Therefore, the transmission component 180 can adopt different transmission gears 182 to adjust the gear ratio more flexibly, to make the first rack 124 rotate an angle different than the second rack 162. Besides, a limited space inside the base 140 can be more elastically arranged to accommodate the transmission gears 182 for avoiding the transmission component 180 being conflicted to other components disposed within the base 140.

Figure 3:
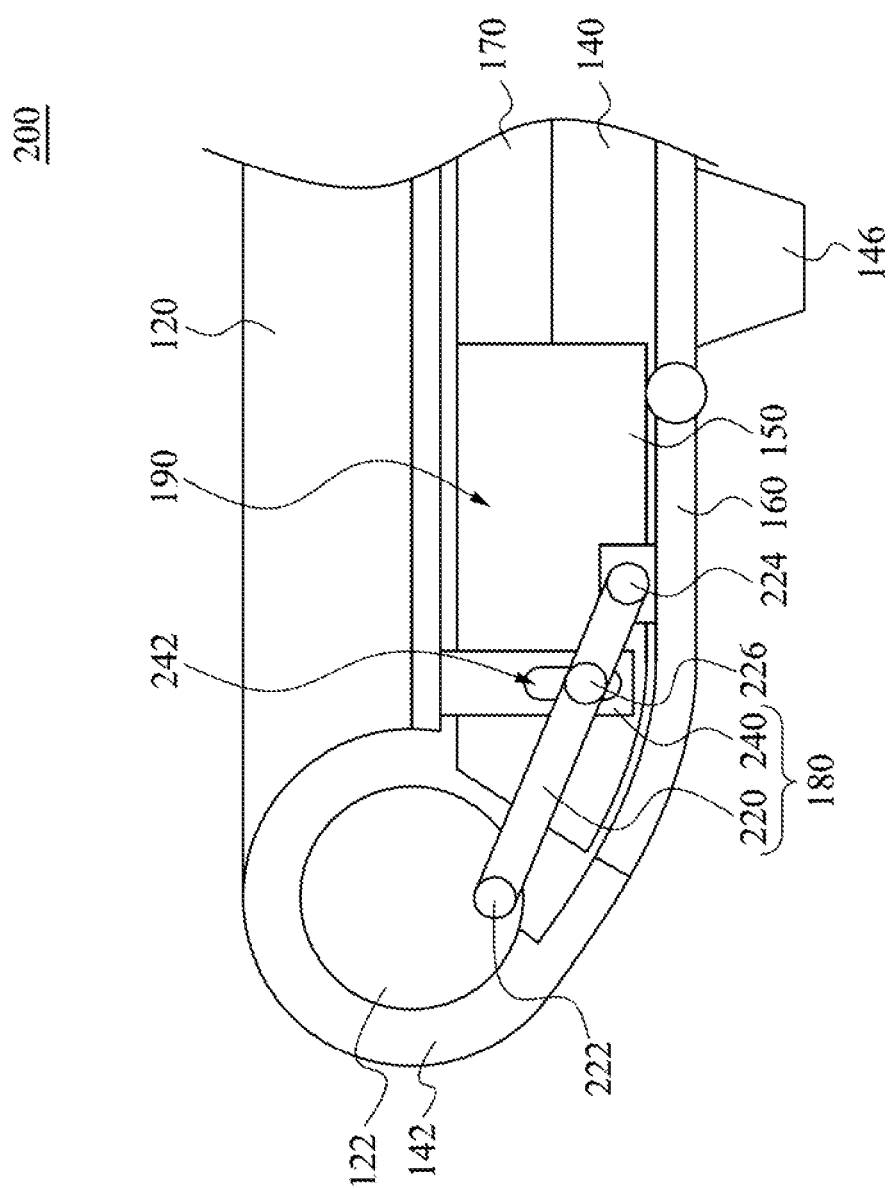
FIG. 3 and FIG. 4 are longitudinal sectional views of an electronic apparatus at different states according to another embodiment of the present disclosure.
Figure 4:
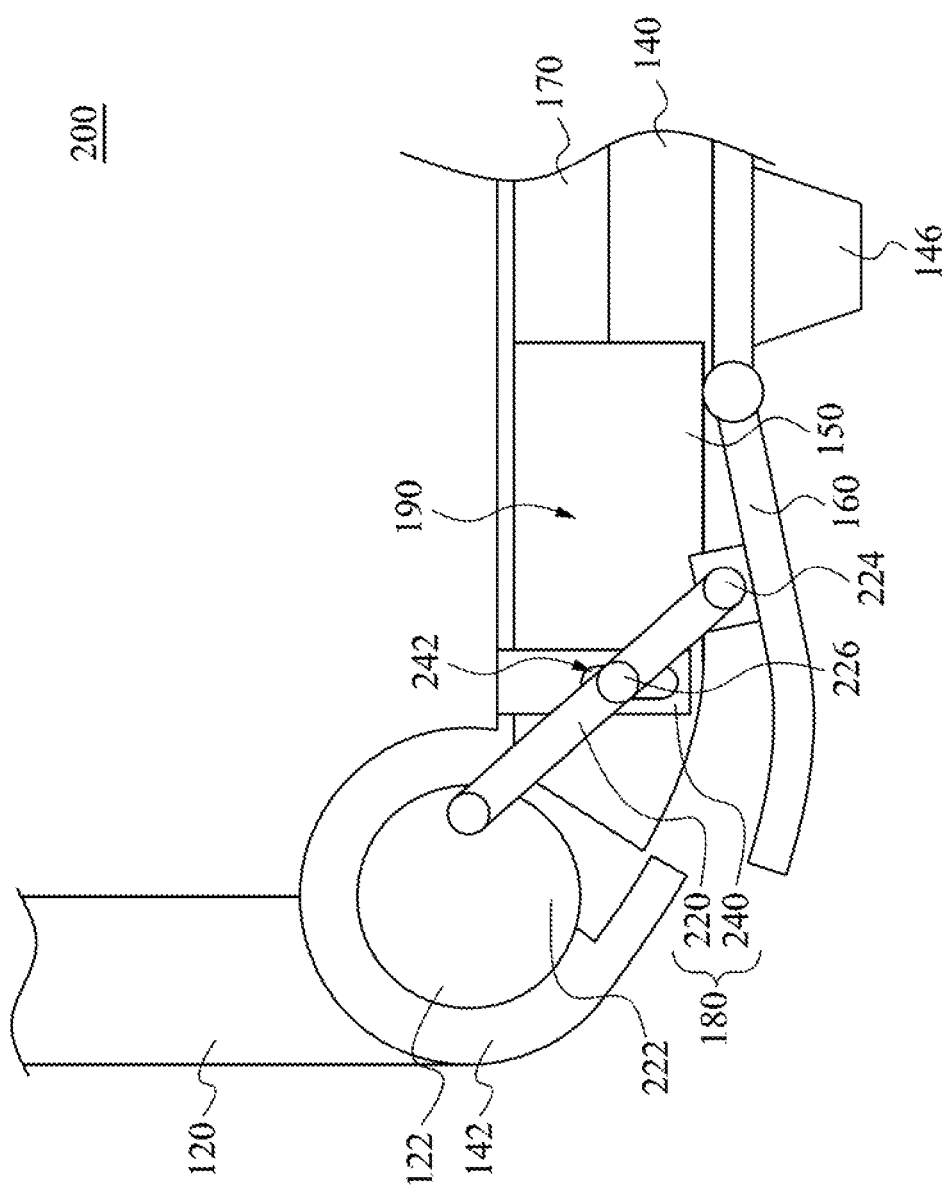

FIG. 3 illustrates a longitudinal sectional view of an electronic apparatus 200, when a display component 120 covers a base 140, according to another embodiment of the present disclosure. FIG. 4 illustrates a longitudinal sectional view of an electronic apparatus 200, when a display component 120 rotates relative to a base 140 and open from the base 140, according to another embodiment of the present disclosure. As shown in FIG. 3, in some embodiments, the transmission component 180 may include a connecting rod 220. The connecting rod 220 have a first pivot point 222, a second pivot point 224, and a third pivot point 226, in which the third pivot point 226 is substantially located between the first pivot point 222 and the second pivot point 224. The first pivot point 222 and the second pivot point 224 are pivotally connected to the rotational shaft 122 and the moveable case 160 respectively, and the third pivot point 226 is slidably pivotally connected to the base 140. As shown in FIG. 4, when the display component 120 is rotated relative to the base 140 and rotates the rotational shaft 122, the rotational shaft 122 actuates the moveable case 160 through the connecting rod 220.

In some embodiments, the transmission component 180 may further includes a frame 240 disposed inside the base 140. The frame 240 has a trench structure 242. The third pivot point 226 is slidably pivotally connected at the trench structure 242.

Referring to FIG. 3, when the moveable case 160 covers the opening 144, a space collectively surrounded by the moveable case 160 and the base 140 is defined as a heat-dissipated channel 190. Referring to FIG. 4, when the moveable case 160 uncovers the opening 144, the heat-dissipated channel connects to the opening 144. In some embodiments, the electronic apparatus 100 may further include heat-dissipated fins 150 disposed inside the heat-dissipated channel 190, in which the heat-dissipated fins 150 can exchange heat with circumstance more directly through the opening 144. In some embodiments, the electronic apparatus 100 may further include a fan module 170. The fan module 170 is disposed inside the base 140. The fan module 170 has an outlet communicated with the opening 144, so that the heated air, generated by exchanging heat with the heat-generated components inside the base 140, can freely leave the base 140 from the opening 144 without any obstruction.

In some embodiments, when the display component 120 is rotated toward the base 140 and abuts against the base 140, the connecting rod 220 can actuate the moveable case 160 to rotate to fully cover the opening 144. That is, the base 140 includes a housing. When the moveable case 160 fully covers the opening 144, the moveable case 160 is close-fitting with the housing of the base 140. Therefore, when the heat-dissipated channel 190 is not operated to be a positive pressure, the moveable case 160 can avoid or reduce dust or foreign matters from circumstance penetrating the base 140 from opening 144 and influenced other component operated properly.

Summarized from the above, an electronic apparatus includes a display component, a base, a moveable case, and a transmission component. The display component includes a rotational shaft. The base is pivotally connected to the rotational shaft. The base has an opening. The moveable case is pivotally connected to the base. The moveable case can selectively cover or uncover the opening. The transmission component is disposed on the base. The transmission component operatively connects the rotational shaft and the moveable case. When the display component is rotated away from the base, the rotational shaft actuates the moveable case to rotate to uncover the opening through the transmission component, and a heat dissipation channel can be formed between the heat-dissipated modules of the base and circumstance, to diffuse and dissipate the heat accumulated inside the base. When the display component is rotated toward the base, the rotational shaft actuates the moveable case to rotate to cover the opening through the transmission component, to protect and avoid dust or foreign matters penetrating into the base. Therefore, the thinning electronic apparatus can be loaded with more components, in the meanwhile, the electronic apparatus still can manage a great heat dissipation efficiency through forming a heat dissipated channel by uncovered the rotating moveable case from the opening.

Although some embodiments of the present disclosure and their advantages have been described in detail, it should be understood that various changes, substitutions, and alterations can be made herein without departing from the spirit and scope of the disclosure as defined by the appended claims. For example, it will be readily understood by those skilled in the art that many of the features, functions, processes, and materials described herein may be varied when remaining within the scope of the present disclosure.

Moreover, the scope of the present application is not intended to be limited to the particular embodiments of the process, machine, fabricate, composition of matter, means, methods, and steps described in the specification. As one of ordinary skill in the art will readily appreciate from the disclosure of the present disclosure, processes, machines, fabricate, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, fabricate, compositions of matter, means, methods, or steps.

What is claimed is:

1. An electronic apparatus, comprising:
   a display component comprising a rotational shaft;
   a base pivotally connected to the rotational shaft, the base having an opening;
   a moveable case pivotally connected to the base and configured to selectively cover or uncover the opening; and
   a transmission component disposed on the base and operatively connected between the rotational shaft and the moveable case,
   wherein the transmission component comprises a connecting rod having a first pivot point, a second pivot point, and a third pivot point, and third pivot point is substantially located between the first pivot point and the second pivot point the first and the moveable case respectively, the third pivot point is slidably pivotally connected to the base, wherein when the display component is rotated relative to the base, the rotational shaft actuates the moveable case through the connecting rod, when the display component is rotated away from the base, the rotational shaft actuates the moveable case to rotate to uncover the opening through the transmission component, and
   when the display component is rotated toward the base, the rotational shaft actuates the moveable case to rotate to cover the opening through the transmission component.

2. The electronic apparatus of claim 1, wherein the transmission component further comprises a frame disposed inside the base, the frame has a trench structure, and the third pivot point is slidably pivotally connected at the trench structure.

3. The electronic apparatus of claim 1, wherein when the moveable case covers the opening, a space collectively surrounded by the moveable case and the base is defined as a heat-dissipated channel, wherein when the moveable case uncovers the opening, the heat-dissipated channel is communicated with the opening.

4. The electronic apparatus of claim 3, further comprising a heat-dissipated fin disposed inside the heat-dissipated channel.

5. The electronic apparatus of claim 1, wherein further comprising a fan module disposed inside the base, and the fan module has an outlet communicated with the opening.

6. The electronic apparatus of claim 1, wherein the base further comprises a plurality of supporting structures disposed on a surface of the base, and the supporting structures have a supporting structural height, wherein when the moveable case rotates to uncover the opening till a fully-opened state, a height of the moveable case relative to the surface of the base is smaller than the supporting structural height.

7. The electronic apparatus of claim 1, wherein when the display component is rotated toward the base and abuts against the base, the moveable case fully covers the opening.

* * * * *